Feb. 22, 1955 S. P. KINNEY 2,702,699
GAS WASHER
Filed Aug. 30, 1951 3 Sheets-Sheet 1

INVENTOR
Selwyne P. Kinney.

BY Christy, Parmelee and Strickland
ATTORNEYS

Feb. 22, 1955

S. P. KINNEY 2,702,699

GAS WASHER

Filed Aug. 30, 1951

INVENTOR.
Selwyne P. Kinney.
BY
Christy, Parmelee, Strickland
ATTORNEYS:

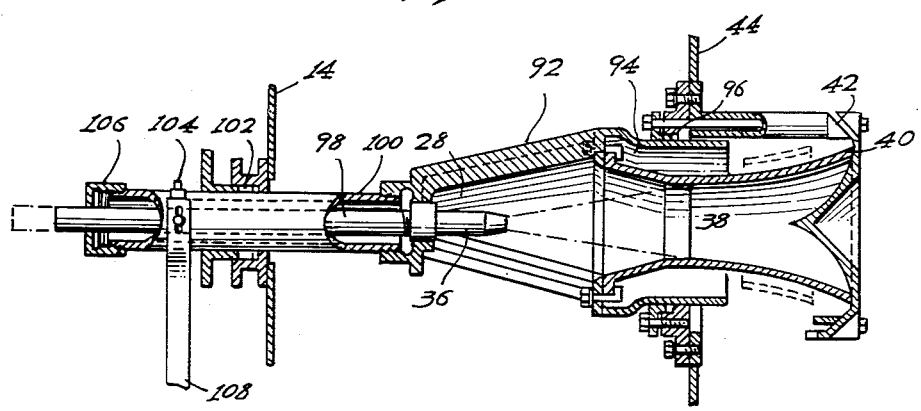

United States Patent Office 2,702,699
Patented Feb. 22, 1955

2,702,699
GAS WASHER

Selwyne P. Kinney, Crafton, Pa., assignor to S. P. Kinney Engineers, Inc., Carnegie, Pa., a corporation of Pennsylvania Application August 30, 1951, Serial No. 244,284

10 Claims. (Cl. 266—25)

This invention is for the washing of industrial gases. More particularly, the invention relates to an improved method and apparatus for washing gas containing dust or vapors, and provides an improvement in the washing of gases especially useful where there may be wide fluctuations in the volume of the gases being handled.

In the operation of a blast furnace, for example, a combustible gas is formed which is discharged at or near the top of the furnace, and which carries a large amount of dust. This gas normally contains carbon monoxide and other combustibles, and is used in the blast furnace stoves or elsewhere for heat generating purposes. At the present time washers are provided for cleaning this gas before it is again burned, but in order to handle the necessary volume of gases, these washers are excessively large, and even so are not capable of effectively operating when there is a surge of high pressure gas, or where the volume of gas is abnormally increased.

Abnormal and often sudden pressure increases develop in the blast furnace due to irregularities in its operation, such as occurs, for example, when the downward movement of the column in the furnace is stopped and the charge then slips. Such a slip produces a heavy surge of gas, or there may be some irregularity that will produce a surge of gas. Normally this is taken care of by explosion doors which are forced open under the abnormal increase in pressure, discharging dust-laden gases directly into the atmosphere. This is a cause of discomfort or annoyance and damage to occupants and residents in the neighborhood of the furnace, and may be harmful to health of people, animals and vegetation in the surrounding communities.

Other industrial operations also produce large quantities of gases which may be burdened with solids or combustible vapors, and which are required to be washed before they can be either used or discharged into the atmosphere.

According to the present invention there is provided an apparatus and method by which large quantities of gas may be effectively cleaned without excessively large washing towers, and without many of the limitations and drawbacks that characterize present washing equipment. The invention further provides a gas washer which is less likely to be clogged than conventional washers presently used, and it provides in a single construction, apparatus for removing all but a trace of the entrained materials, so that successive washing operations are not required.

The invention has as a primary object to provide an improved apparatus and method for washing gas to effectively remove entrained impurities, which may be either solids or vapors.

A further object of the invention is to provide an apparatus of a relatively compact construction which will effectively handle large volumes of gases, including abnormally large surges.

A further object of the invention is to provide a washing apparatus which is regulated according to the volume of gas, and wherein increased washing capacity is provided to take care of surges or excess quantities of gas, thereby enabling more of such surges to be handled without the opening of the explosion doors or other relief passages directly to the atmosphere.

My invention may be more fully understood by reference to the accompanying drawings, in which:

Fig. 4 is a vertical sectional view of a high pressure disintegrator which is used in the gas washer when abnormally large volumes of gas are being supplied to the washer.

The gas washer illustrated is especially adapted to the washing of gases generated in the iron blast furnace, and in the accompanying description is illustrated and described particularly in such connection. However, it is to be understood that this is by way of illustration, and that the invention is applicable to various fuel-burning equipment and power plants or metallurgical furnaces and the like, where effective means for washing large volumes of gas are required, and particularly where there may be periods of abnormal volume or excessive pressure.

Figures 1, 3:
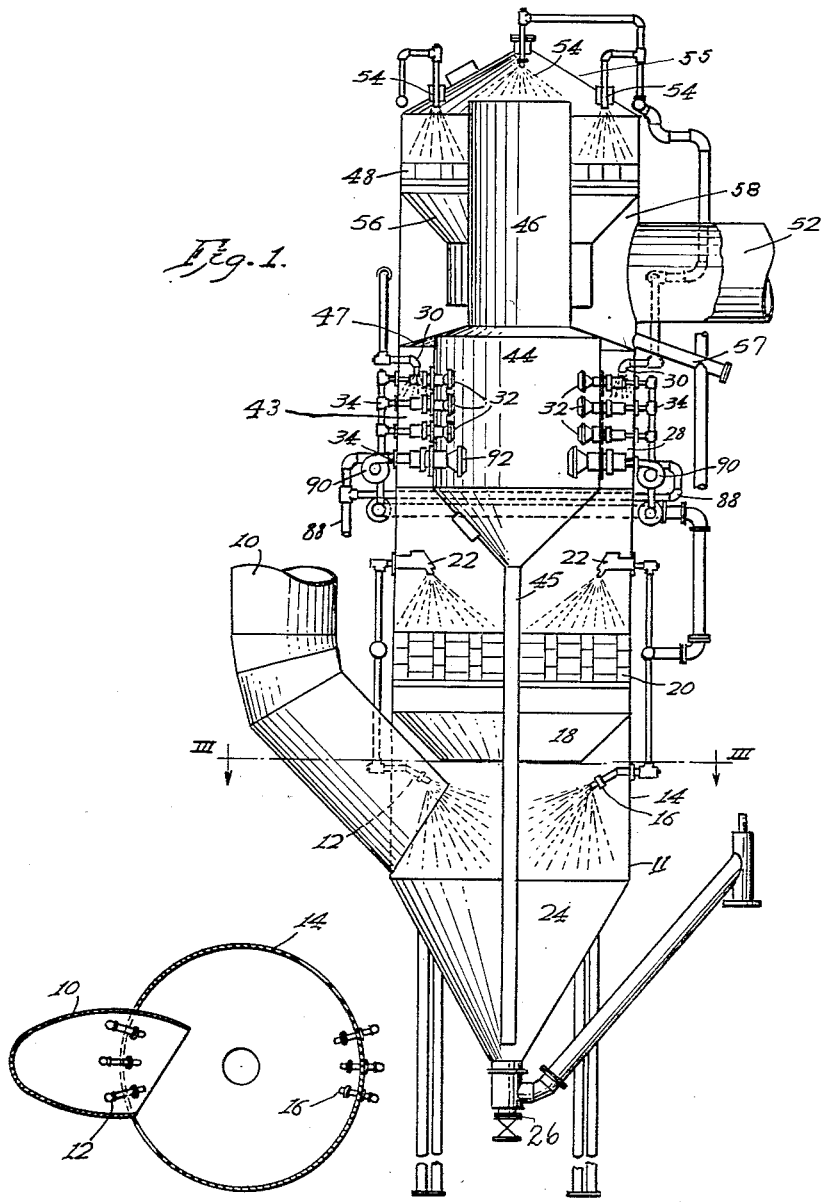
Fig. 1 is a view in vertical section of a gas washer embodying the preferred form of the invention.
Fig. 3 is a sectional view of the gas washer taken on the line III—III of Fig. 1, which shows the arrangement of fog nozzles for distributing water in the gas entering the washer.

Referring to Fig. 1, 10 designates a conduit through which gas from a blast furnace or other gas producer is led into the washer which is designated generally as 11. As shown in Fig. 1, the washer is of a generally cylindrical construction having an inverted conical bottom 24. As shown in Figs. 1 and 3, the conduit 10 terminates just above the conical bottom 24, and it preferably projects downwardly and somewhat angularly or tangentially, so as to give both a downward and a whirling motion to the gases. Generally the gases will have passed through a cyclone or similar dust collector before being discharged into the conduit 10 as is now customary in the art, so as to be relieved of a substantial portion of their burden before they are subjected to washing.

Arranged in the upper part of the discharge end of the conduit is a series of several water nozzles designed to produce a very fine spray, or what is often referred to in the art as a "fog." This fog is directed in the line of travel which follows generally the path of travel of the gases, so that the minute particles of water are entrained with the gases.

About opposite the nozzles 12 is another series of nozzles 16, also arranged to produce a fine mist or fog, and these too are projected downwardly into the cone 24. The spray from the nozzles 16 is thus opposed to the flow of gases upwardly, which produces a great turbulence in the lower part of the washer and results in a substantial part of the dust particles being wetted and precipitated. Dust particles which have been wetted by water from the nozzles 12 may pick up additional water from the nozzles 16 to form drops which are large enough to fall to the bottom of the cone and be withdrawn through the outlet valve 26. Also the water discharged from the nozzles 12 and 16 substantially cools the gases, reducing their volume, and thorough intermingling of the fog effectively and more rapidly removes the solids. In addition to reducing the volume of the gases, the cooling will also result in the condensation of a substantial part of the volatiles in the gases if there be any, and these being mixed with water are carried down. Also as the gases are discharged into the cone 24 there is a drop in velocity of the gases which aids in the removal of solids and the gases are diffused through the cone so as to become more completely distributed, and the fog is thus more effective for the removal of solids. Above the nozzles 12 and 16 is a downwardly-sloped annular baffle plate 18 through the center of which the upwardly-flowing gases will pass. This baffle assists in maintaining a condition of turbulence in the lower part of the washer, and a more effective precipitation of water and impurities. Inside the washer 11 above the baffle 18 is a series of tiles like those now commonly used in conventional gas washers, or of any other suitable design, these tiles being more or less conventionally illustrated. They are well known in the art and provide generally a large number of vertical flues or passages which cause the gas to be broken up into small streams providing a large area of contact for the gases as they pass through the tiles.

Above the tiles 20 there are spray nozzles 22. The spray from the nozzles 22 must be traversed by the upwardly-flowing streams of gases, causing the further extraction of impurities from the gas, and the water from the sprays trickles down through the tiles, keeping the surfaces of them wet, so that the usual large surface for interchange between the upwardly-flowing gases and the downwardly-flowing film of water provided in washers of this type can be secured.

There is a hollow cylindrical casing inside the washer above the nozzle 22, this casing being designated 44, and it has an inverted conical bottom terminating in a downwardly-extending duct 45 which reaches almost to the outlet 26 at the bottom of the washer. The casing 44 also has a cylindrical extension 46 of smaller diameter near the top that reaches up to a point near the roof of the washer, but which terminates in spaced relation to the roof. There is a sloped baffle 47 which prevents the gases from rising in the space around the chamber 44 above the baffle 47. The casing thus forms a vertical partition between the upper and lower ends of the tower. Passing radially through the walls of the casing or chamber 44 are a number of disintegrators which are designated 32, and which may be disposed in any desirable arrangement around the walls of the chamber 44. The disintegrators 32 are preferably all of relatively small size, a relatively large number of them being provided, and they are sufficient in number to accommodate the normal flow of gases through the generator.

The general construction of the disintegrators is similar to that shown in United States patent to Dill, No. 2,088,691, and in general is like the larger distintegrator 92 which is shown in detail in Fig. 4. The disintegrators 32 each have a venturi tube similar to the venturi tube 38 in Fig. 4, and each has a baffle plate at the inner end thereof spaced a slight distance therefrom, similar to the baffle plate 40 shown in Fig. 4, but unlike the structure shown in Fig. 4 and hereinafter more fully described, there is no relative movement between the venturi and the baffle plate as there is in the arrangement shown in Fig. 4. Each of the disintegrators 32 has a nozzle similar to the nozzle 36 of Fig. 4, which is outside the shell 44, and which is projected toward the throat of the venturi, and there is a mixer so that gases will be drawn from the space 43 around the shell 44 into the venturi of the several disintegrators by the jets or streams of water in a manner similar to that described in the Dill patent, and familiar to those skilled in the art. Thus substantially all of the gases are transferred from the space 43 to the inside of the container 44 through these disintegrators where the gas is very intimately and very violently entrained and intermixed with high pressure streams of water which then strike the deflecting plates 40 to cause all but the very smallest traces of foreign particles to be entrained with the water. The water that is discharged from the disintegrators into the interior of the chamber 44 flows down the pipe 45. The valve 26 is so regulated as to maintain a slight depth of water at the bottom of the washer so that gases in the chamber 24 cannot travel up through the tube 45, but if any gases are entrained with the water flowing down the tube 45, such gases can escape into the conical bottom 24 and be joined with newly entering gas.

Water is supplied to the several disintegrators 32 through the piping system shown, including the manifold 34. To further clean the gases, there may be spray nozzles 30 under the baffle 47 and discharging a spray of water through the gases which are accumulated in the sprays 43 for passage through the disintegrators.

The gases which separate from the water after passing through the disintegrators rise through the conduit 46 where they are discharged under the conical top 55 of the washer. Spray nozzles 54 are arranged at the top for further wetting down any particles, and the gases flow down around the outside of the conduit 46 through the spray generated by the nozzles 54 through a second tile partition 48, this time flowing through the tiles in the direction of the flowing water, instead of counter-current as in the tile partition 20. Below the layer of tile 48 there is a collar 56 concentric with the conduit 46 through which the water and gases flow. The water is carried out through a pipe 57, while the gases escape into an annular chamber 58 from whence they are carried off through the top pipe 52.

The equipment as thus far described is designed to take care of the normal flow of gas through the washer, and it will effectively clean relatively large quantities of gas in proportion to its cubical content. For example, gases which enter the washer containing about 5.0 grains of solid per cubic foot of gas will leave the washer with not more than about 0.025 grains per cubic foot. This is a negligible amount. Preliminary and complete washing is thus effected in the single washer, and a succession of washers is not required. Moreover, the design and construction is such as to minimize accumulation of solids at any point, and hence frequent cleaning of the washer is not required.

In accordance with my invention, additional disintegrators are provided for handling additional quantities of gas, as for example when there are surges of gas which bring the volume up to a point much larger than the normal volume intended to be handled by the washer. These disintegrators designated 92 are preferably larger than the disintegrators 32, but are of generally similar construction. However since they are intended to provide additional capacity only under abnormal conditions, they are designed for intermittent operation. If they were not provided, the washer would not have adequate capacity when a surge of gas was encountered, and if they operated continuously there would be too much disintegrator capacity with inefficient use of the water. Consequently my invention further provides the disintegrators 92 which are normally closed to prevent the free flow of gas therethrough, and which are normally inoperative, but which are opened and rendered operative when the volume of gas requires additional capacity.

Figure 2:
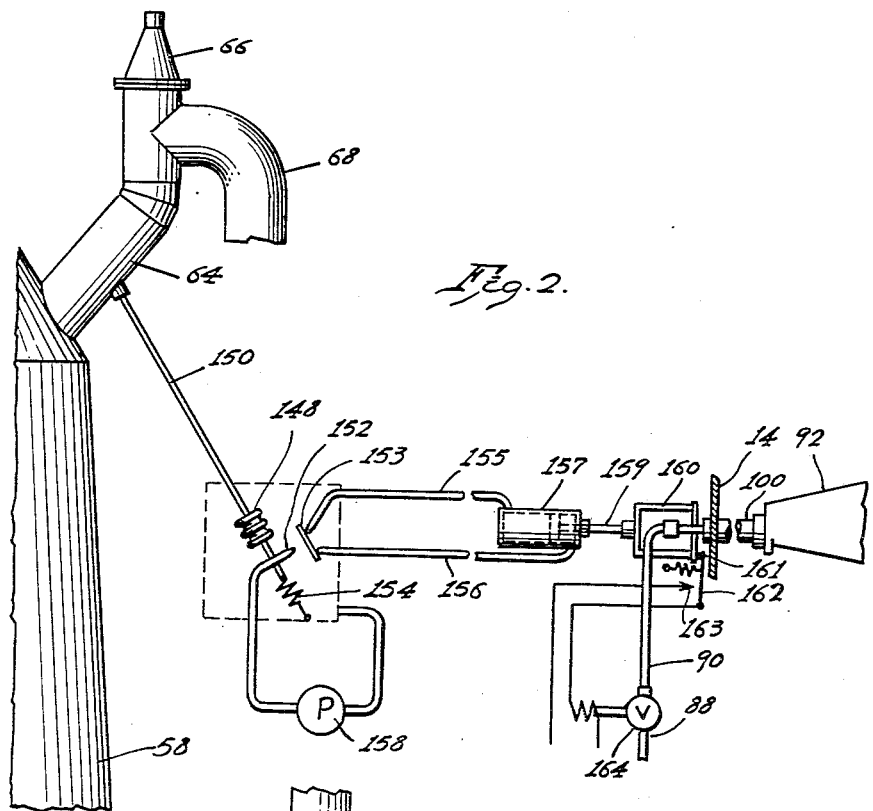
Fig. 2 is a schematic view of a portion of a blast furnace showing a well-known type of pressure-responsive equipment for placing the high pressure disintegrators into operation when operating conditions so require.

Referring to Fig. 2, a portion of a blast furnace of conventional form is more or less schematically illustrated. The furnace itself is designated 58, and 64 is a gas outlet pipe at or near the charging bell at the top of the furnace. In accordance with usual practice, the pipe 64 is provided at its upper end with an explosion door or pressure release device 66, and there is a down-comer pipe 68.

While various forms of pressure responsive devices may be used for controlling the disintegrator 92, I have shown a jet discharge regulator for this purpose. One well known type of regulator of the jet top type is sold under the trade name "Askania," and I have schematically illustrated such a control wherein there is a pressure tube 150 that leads from the discharge pipe 64 to a diaphragm or bellows 148, which diaphragm or bellows 148 moves a pressure discharge nozzle or jet top nozzle 152 relative to an orifice plate 153. Movement of the nozzle is opposed by a spring 154. The plate 153, as is well understood by those skilled in the art, has two separated openings leading to pipes 155 and 156 respectively. The pipes 155 and 156 terminate at opposite ends of a cylinder 157. High pressure oil is circulated by a pump 158 to the nozzle 152, and the oil jet thus generated, striking one orifice or the other, creates a greater pressure on one side of the piston than the other to effect movement of the piston rod 159. This piston rod 159 is connected to a yoke 160 for moving the yoke 160 back and forth. The yoke 160 has an abutment 161 that normally holds an electric contact 162 away from a cooperating switch point 163, which contact and switch point control a solenoid actuated valve 164 in a high pressure water line 88 which is connected through a flexible tube 90 to the venturi throat nozzle 36 of the high pressure disintegrator shown in Fig. 4.

It will be noted from Fig. 1 that the high pressure disintegrator 92 is larger than the disintegrator 32. Although only two high pressure disintegrators are illustrated as opening into the chamber 28 of washer 14, a series of disintegrators may be distributed around the chamber in order to provide the desired gas washing capacity. The high pressure disintegrators are normally held in closed position as illustrated in Fig. 4, and in this position the venturi 38 is closed against the deflector plate 40, and at the same time the solenoid valve 164 is closed. There is a sleeve 100 around the nozzle 36, and one end of this sleeve is connected by a shell 94 which moves through a packing gland 96 mounted in the wall of the washer 14 between the chamber 28 and the chamber 44. The sleeve 100 passes through a gland 102 in the shell 14 of the washer, and at its outer end is connected with the yoke 160. By movement of yoke 160 toward the left as viewed in Fig. 2, the venturi may be retracted to the dotted line position shown in Fig. 4, at which time it is open to the circulation of gases therethrough.

In the arrangement described, when there is an increase in pressure in the outlet pipe 164 at the top of the furnace, the bellows 148 is actuated to move the nozzle 152 to increase the pressure in line 156 to cause the piston rod 159 to move toward the left. When the piston moves toward the left, the passageway through the venturi is opened as hereinabove described, and at the same time contact 162 closes a circuit with point 163 to energize the solenoid valve 164 and allow high pressure water to flow to the nozzle 36. When normal pressure conditions are restored in the pipe 64, requiring the processing of only a normal flow of gas, the operation of the jet is reversed to close the valve 164 and move the venturi to the right.

Figure 2A:
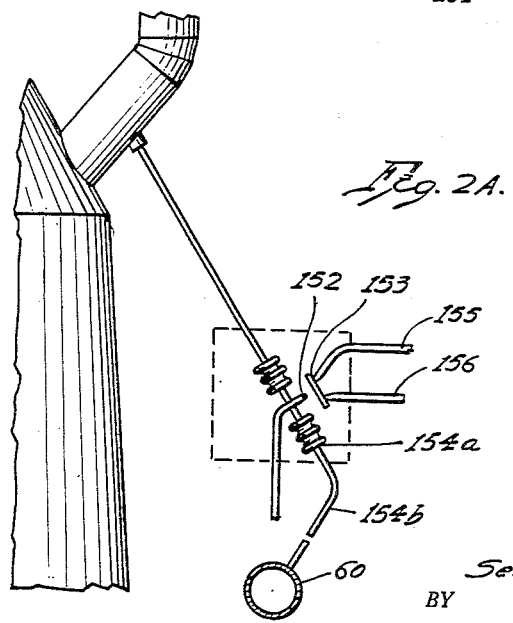
Fig. 2a is a similar view of a slightly modified arrangement in which the operation of the high pressure disintegrator nozzle is controlled by differential pressure between the outlet at the top of the furnace and the bustle pipe at the bottom.

In Fig. 2 the mechanism responds entirely to pressure in the outlet pipe 64 at the top of the furnace. Sometimes it may be desirable to use a differential pressure between the outlet of the furnace and the bustle pipe that supplies air to the tuyères at the bottom of the furnace. In this case a differential control is substituted for the control shown in Fig. 2, and such a differential control is schematically illustrated in Fig. 2a in which corresponding reference numerals have been used to indicate the corresponding parts, and in which the complete control arrangement has been duplicated. Instead of the bellows 148 being opposed by a spring 154 as described in connection with Fig. 2, there is a second bellows 154a that is connected through a tube 154b with the bustle pipe of the furnace designated 60. Hence the jet 152 will move relative to the orifice plate 153 in response to the pressure walls in the pipe 64 and the bustle pipe 60.

My invention thus provides a gas washer having a series of disintegrators which are always open to the flow of gases therethrough, and which are sufficient to take care of the normal conditions of operation. However where there are unusual conditions creating an excessive volume of gas, additional disintegrators are automatically put into operation so as to prevent any building up of back pressure in the washer or any of the pipes leading to the washer. At the same time such additional disintegrators, being normally closed against the deflector plates, cannot permit gas to flow therethrough when the water jets are not operating. This arrangement provides a substantial saving in the cost of operation, since water is supplied to the additional disintegrators 92 only at the time when they are actually required to be in service.

With the construction described above, the explosion doors 66 at the top of the blast furnace may be weighted so that they will only open when a dangerous pressure is developed in the blast furnace. The disintegrator in the washer will take care of gas which is particularly dirty, and the pressure will force the gas through the washer at a higher rate so that excess gas will be effectively washed to remove solids and vapors. Although the pressure may vary over a wide range, the disintegrators 92 will stay in operation so long as the pressure in the blast furnace is above a desired predetermined maximum, and still below a dangerously high pressure. The large disintegrators which are not required for normal operation will only be put into operation when an excess volume of gas, or gas at a pressure above a predetermined maximum, is forced through the washer. With this arrangement, practically any condition of the operation of the blast furnace may be taken care of by the washer without requiring the explosion doors to be open to pass dust and vapors, together with combustible gas, out to the atmosphere.

The preferred form of the invention having been thus described, what is claimed as new is:

1. A gas washing apparatus comprising a tower, means to introduce gas containing solids and vapors near the base of the tower, means to introduce water into gas flowing through the tower, a barrier containing a series of restricted passageways positioned in the tower above the gas entrance to cause the gas to pass through the passageways to mix gas with water to coalesce water and solids for separation from the gas, a first series of venturi throat mixers mounted in the tower above the barrier in the path of gas flowing through the tower to mix gas with water, a high pressure water supply means connected with said mixers to operate them, deflectors on the mixers to form a fine spray for separating water vapors and solids from the gas, a gas outlet near the top of the tower and a series of passageways for the gas between the venturi throat mixers and the gas outlet to separate water from the gas passing therethrough, a second set of venturi throat mixers positioned in the tower adjacent the first series of washers in the path of gas flowing through the tower, said second series of washers being normally inoperative and closed for passage of gas therethrough, a connection for supplying water to the second set of venturi washers, a mechanism connected with a generator for the raw gas and responsive to the volume of gas being supplied to the tower to open the second series of washers and spray water therethrough when the gas increases above a predetermined volume.

2. The washing apparatus defined in claim 1 in which the mechanism places the second set of washers into operation in response to an increase of pressure above a predetermined maximum pressure at which the gas is supplied to the tower.

3. The washing apparatus defined in claim 1 in which fog nozzles are mounted in the base of the tower adjacent the gas inlet and a water supply is connected with the nozzles to introduce a water fog into the gas entering the tower.

4. A gas washing apparatus comprising a tower, means to introduce gas containing solids and vapors near the base of the tower, spray nozzles to introduce water into the gas entering the tower, a barrier containing a series of restricted passageways positioned in the tower above the gas entrance to cause the gas to pass through the passageways to mix the gas and water to coalesce water and solids for separation from the gas, a first series of venturi throat mixers mounted in the tower above the barrier in the path of gas flowing through the tower to mix gas with water, a high pressure water supply means connected with said mixers to operate the gas mixers, a deflector near the throat of the mixers to form a fine spray for separating water solids and vapor from the gas, a gas outlet near the top of the tower, a series of passageways for the gas between the venturi throat mixers and the gas outlet to separate water from gas passing therethrough, a second series of venturi throat mixers positioned in the tower adjacent the first series of mixers in the path of gas flowing through the tower, said second series of washers being normally inoperative and closed for passage of gas therethrough, a connection for supplying water to a second set of venturi washers, a blast furnace, control mechanism connected with the blast furnace and responsive to the pressure existing in the furnace for operating motor devices connected with the second series of mixers to open the second series of mixers and admit water thereto for washing gas when the pressure in the furnace exceeds a predetermined maximum pressure.

5. A gas washer comprising a casing having a gas inlet adjacent the bottom thereof and a gas offtake pipe near the top thereof, means providing a vertical partition in the casing blocking the free flow of gas from the bottom to the top of the casing, a set of normal capacity water jet aspirating disintegrators with water lines passing horizontally through said partition and casing, a second set of high capacity water jet aspirating disintegrators with water lines passing horizontally through said partition and casing, said disintegrators constituting the passages through which all gas reaching the water outlet is required to pass, and means operated by gas flowing to the washer and connected with the high capacity disintegrators and their water supply lines on the outside of the casing for selectively opening and closing said disintegrators for gas aspirating operation automatically in accordance with the volume of gas passing through the washer.

6. A gas washer comprising a casing having gas inlet means adjacent the bottom thereof and a gas offtake pipe near the top thereof, means providing a vertical partition in the casing blocking the free flow of gases from the bottom to the top of the casing, a plurality of water jet aspirating disintegrators passing horizontally through said partition and casing and constituting the only passage for gas from the intake side to the outlet side of the casing, some of said disintegrators having a venturi and a deflector at the discharge end of the venturi which are relatively movable for opening or closing the disintegrator against the flow of gas therethrough, and means for automatically selectively effecting such relative movement with changes in volume flow of gas with respect to a predetermined volume of gas flow.

7. A gas washer as defined in claim 6 wherein said last-named means constitutes a servo-motor and means responsive to gas pressure for operating said servo-motor whereby the number of disintegrators through which gas may pass may be varied according to variations in the gas pressure.

8. A gas washer for use in connection with gas generating systems which may produce surges of gas substantially greater than the normal volume, said washer including a tower having gas inlet and outlet passages and means forming a vertical partition between the inlet and outlet passages, a plurality of water nozzle disintegrators mounted in and passing through said partition having a capacity sufficient for the normal flow of gas through the washer and through which the gas must normally flow to pass from one side of the partition to the other, a series of larger disintegrators also mounted in said partition and capable of accommodating a substantially greater flow of gases, means normally closing said larger disintegrators against the flow of gas therethrough, means for measuring the gas flow supplied to the washing tower and mechanism controlled by said measuring means for opening said larger disintegrators and supplying water thereto to provide for treatment of an increased volume of gas.

9. A gas washer for use in connection with gas generating systems which may produce surges of gas substantially greater than the normal volume, said washer including a tower having gas inlet and outlet passages and means forming a vertical partition between the inlet and outlet passages, a plurality of water nozzle disintegrators mounted in and passing through said partition having a capacity sufficient for the normal flow of gas through the washer and through which the gas must normally flow to pass from one side of the partition to the other, a series of larger disintegrators also mounted in said partition and capable of accommodating a substantially greater flow of gases, means normally closing said larger disintegrators against the flow of gas therethrough, means for opening said larger disintegrators to accommodate an increased volume of gas, and means responsive to an increase in the supply of gas for operating said last-named means.

10. The combination with a gas generator which in its operation produces surges of pressure, of a gas washer designed to effectively operate on the normal output of said generator and to accommodate great excesses, said washer including a tower with inlet and outlet connections, means forming a partition between the inlet and outlet connections, a series of normally open disintegrators mounted in said partition through which gases are conveyed from the inlet side of the partition to the outlet side, another series of normally closed disintegrators in said partition through which gases may not normally flow, means for operating said last-named disintegrators to permit the flow of gases therethrough, and means controlled by pressure variation in the gas generator for rendering said last-named disintegrators operative or inoperative.

References Cited in the file of this patent

UNITED STATES PATENTS

| | | |
|---|---|---|
| 809,383 | Lowe | Jan. 9, 1906 |
| 1,793,620 | Jacobus | Feb. 24, 1931 |
| 2,088,691 | Dill | Aug. 3, 1937 |
| 2,204,771 | Rice et al. | June 18, 1940 |